(No Model.)  3 Sheets—Sheet 1.
J. F. LAWRENCE.
MANUFACTURE OF PNEUMATIC TIRES.
No. 584,163.  Patented June 8, 1897.
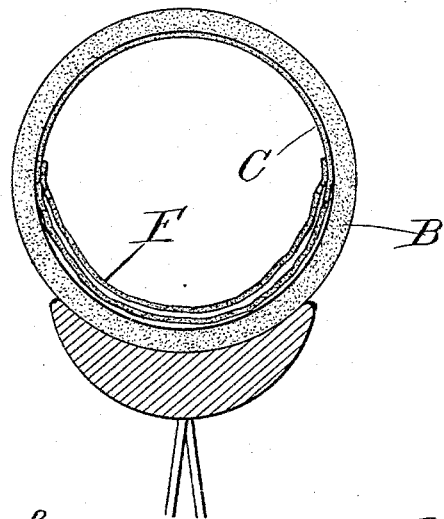
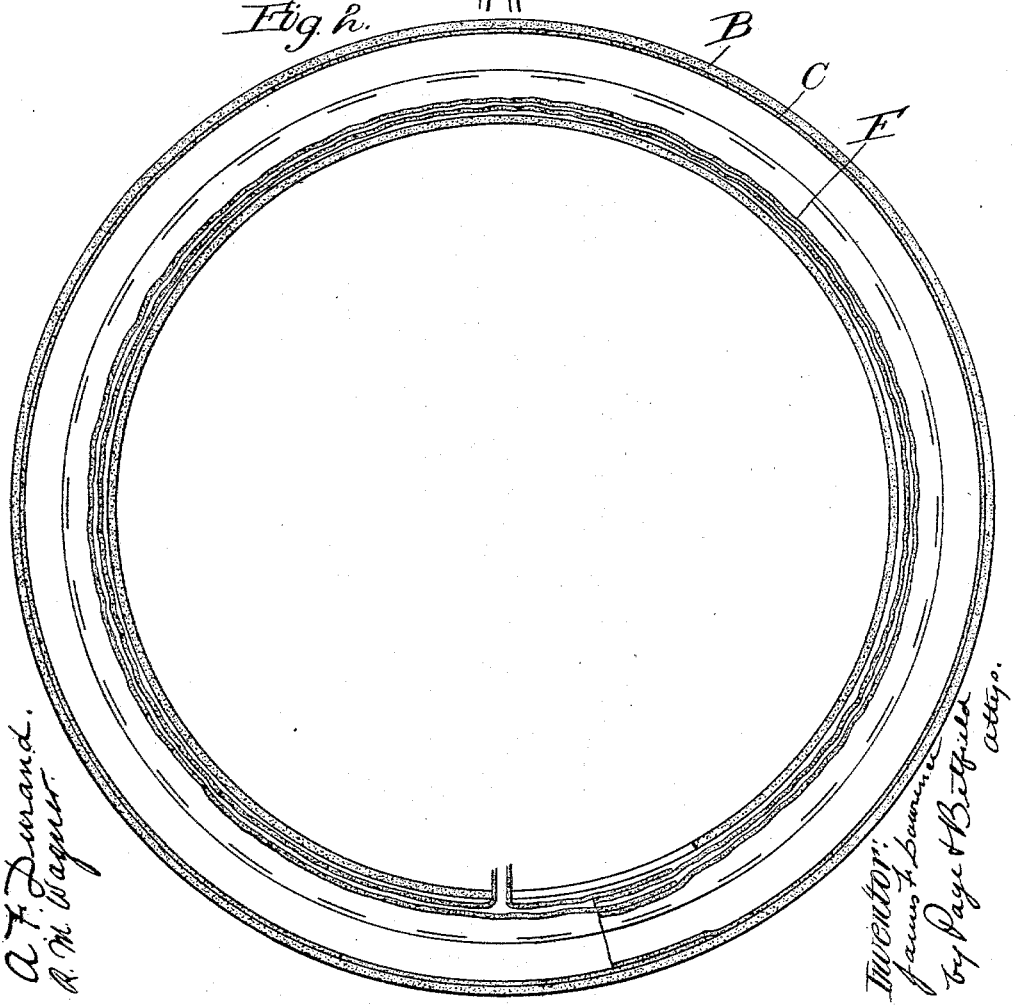

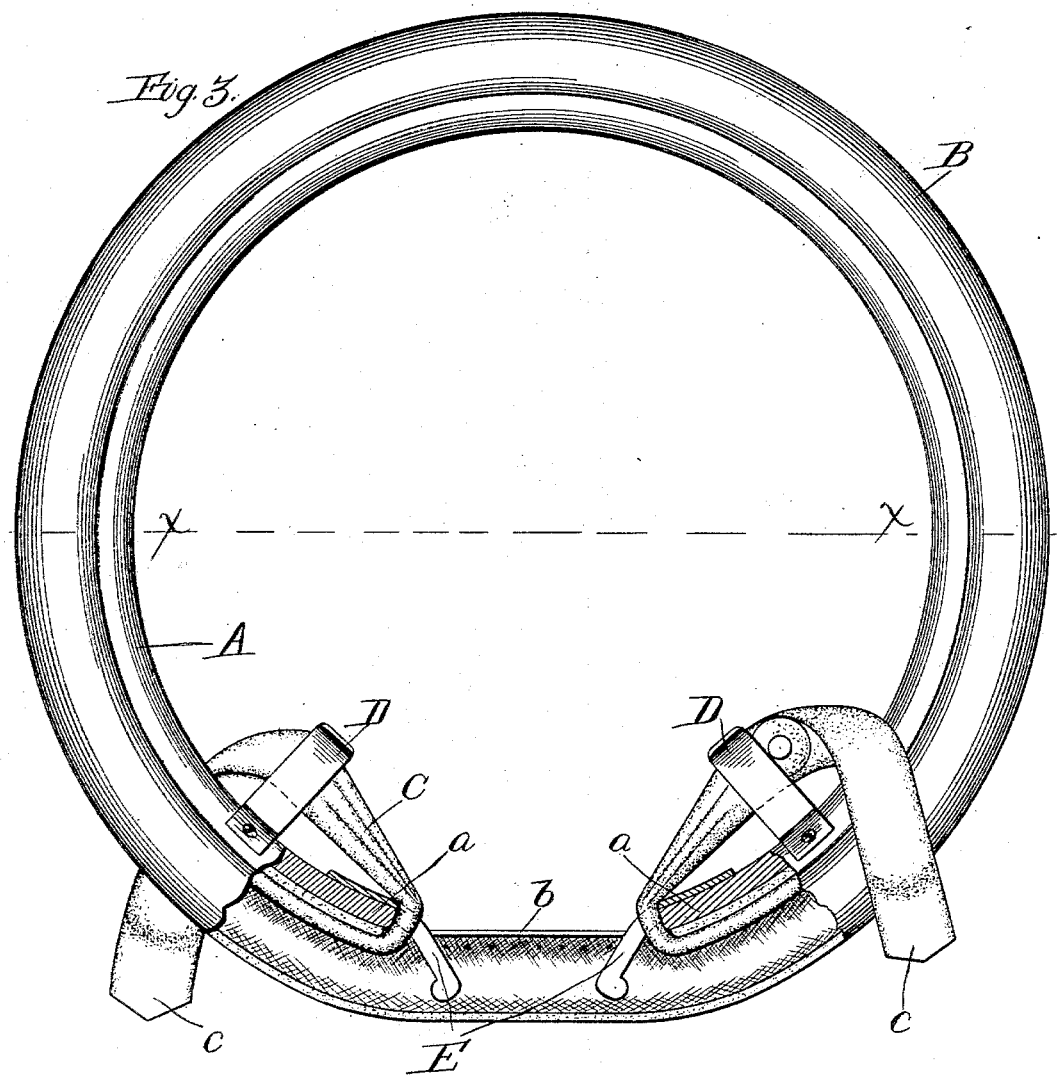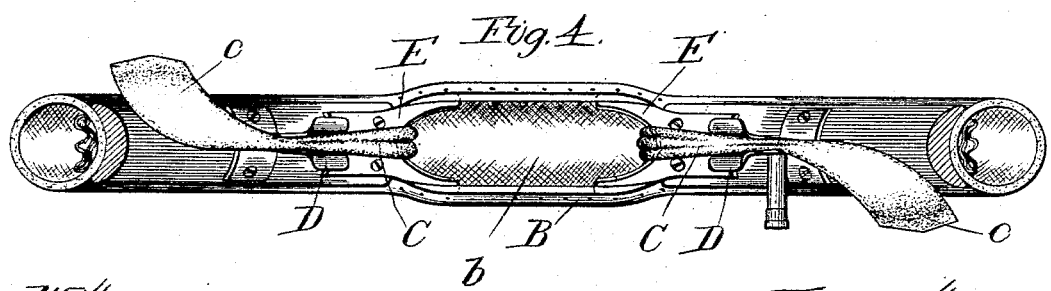

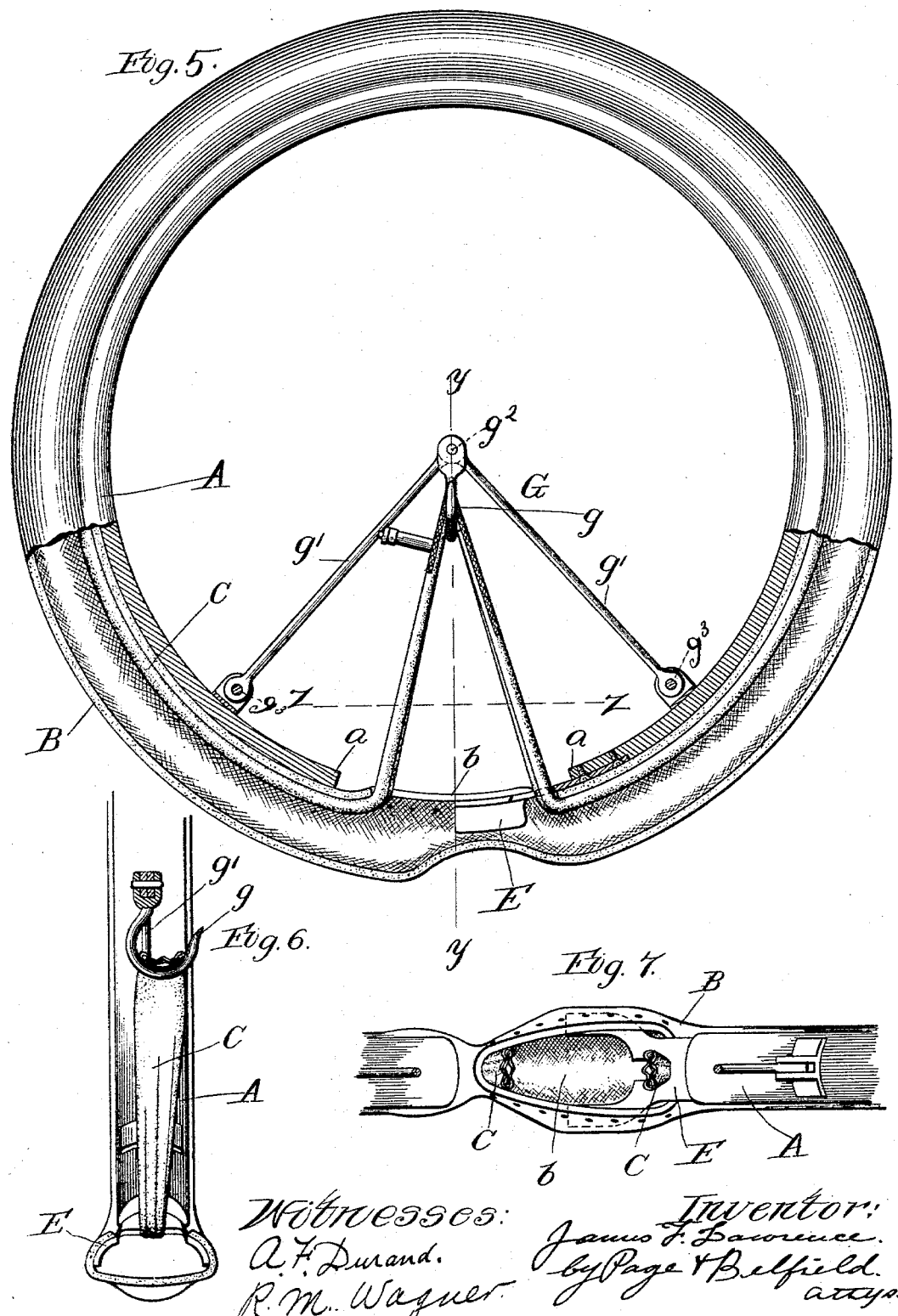

UNITED STATES PATENT OFFICE.

JAMES F. LAWRENCE, OF CHICAGO, ILLINOIS, ASSIGNOR TO THE MORGAN & WRIGHT, OF SAME PLACE.

MANUFACTURE OF PNEUMATIC TIRES.

SPECIFICATION forming part of Letters Patent No. 584,163, dated June 8, 1897.

Application filed March 29, 1897. Serial No. 629,823. (No model.)

*To all whom it may concern:*

Be it known that I, JAMES F. LAWRENCE, a citizen of the United States, residing at Chicago, in the county of Cook and State of Illinois, have invented a certain new and useful Improvement in the Manufacture of Pneumatic Tires, of which the following is a specification.

My invention relates to the production of a construction of pneumatic tire involving a tubular casing and a separately-vulcanized tubular lining which is partially cemented to the inner wall of the casing.

In carrying out my invention I may introduce within the tubular casing a rubber tube having closed ends, or I may introduce within such casing a rubber tube having open ends and then telescope together the ends of such rubber tube. In either case I subject this inner tube to longitudinal tension after it has been introduced within the casing, whereby the tube will be drawn taut against the inner wall of the casing along the base side of the latter. While the inner tube is thus held against the base side of the casing I introduce a suitable quantity of cement, which is caused to flow along the interior of the casing and spread over the inner wall thereof at the tread side, so that by subsequently inflating the inner tube it will be forced against the cement-covered portion of the wall of the casing and be caused to adhere thereto. As a means for temporarily supporting the casing I provide an annular rim—such, for example, as an ordinary wooden wheel-rim—having a gap whereby it can be of such size that it will spring open to an extent to firmly hold the casing and also permit access to be had to a short split in the base of the casing for the purpose of introducing the cement. I also provide this annular support with one or more spreaders adapted to enter the split in the casing and hold the latter open at such point. This annular support is also provided with means for engaging and holding the inner tube in a taut condition, as hereinafter more particularly set forth.

In the accompanying drawings, Figure 1 is a section taken transversely through the completed tire on a wheel-rim. Fig. 2 is a longitudinal section through the tire on a reduced scale. Fig. 3 shows the casing and holder partly in elevation and partly in longitudinal section. In this view the inner tube has its ends closed and drawn out and held by clips or holders on the support for the casings. Fig. 4 is a section on line $x\ x$ looking downward. Fig. 5 is a view similar to Fig. 3, showing the ends of the inner tube united and held by a suitable holding device. Fig. 6 is a detail showing a section on line $y\ y$ in Fig. 5. Fig. 7 is a detail showing a section on line $z\ z$ in Fig. 5.

The annular holder or support A, upon which the casing B is temporarily retained, is practically an ordinary tire-rim having a portion cut away so as to leave a gap between its ends $a\ a$. By such arrangement the base of the casing B can rest upon this supporting rim or holder A and can be arranged thereon so that a short slit $b$ in the base of the casing can be brought opposite the gap in the annular support. By thus forming the annular support A with a gap it can be contracted in diameter so as to permit the casing to be easily placed upon it, and after the casing is in place the annular support can be allowed to expand so as to properly engage the casing and maintain the latter in a properly-extended condition.

In Figs. 3 and 4 the inner tube C has closed flattened ends $c$ and is made of such length that when the tube is in place within the casing the flattened ends of the tube will lap its inflatable portions. This inner tube can be introduced within the casing either before or after the latter has been placed upon the annular support, as may be preferred.

The annular holder A is provided with a couple of clips or tube-holders D D, arranged at opposite sides of its gap and adapted to engage and hold the end portions of the inner tube when such end portions of the latter are drawn out through the slit $b$ in the casing. By such arrangement the inner tube can be drawn taut, so that it will lie at the base side of the casing—that is to say, it will lie against the inner wall of the tire-casing at the base side of the latter. The annular support for the casing is also provided with spreaders or spreader-plates E E, arranged at opposite sides of its gap and adapted to extend through the split in the base portion of the sheath, so as to hold the latter open, as in Fig. 4. After the tube has been drawn taut and its ends caught upon the holders D a suitable quantity of liquid cement can be poured into the casing through the expanded split thereof, and by bodily turning the support and casing as a whole the cement will run along the inner wall of the casing at the tread side thereof and any surplus can of course be allowed to again flow out through the expanded split. After such process the casing can be removed from the support, the ends of the tube can be tucked in the casing, the casing can be laced up along its split, and the inner tube can be inflated. This inflation of the inner tube will cause it to unite with the cement-coated portion of the casing, while the portion of the tube next to the base of the casing will be free and uncemented, as in Fig. 1, in which said figure I have also shown a patching fabric F within the tube.

In Fig. 5 the inner tube has its ends united, as by telescoping. Where the tube is thus made, it can be drawn up and caught upon a holder G, comprising a hook $g$, supported by rods $g'$ $g'$, attached to the annular support A at opposite sides of the gap in the latter. These rods $g'$ are pivotally attached to the shank portion of the hook by a pivot $g^2$, and they are also pivoted to lugs or bearings on the annular support A by pivots $g^3$ $g^3$, such arrangement being desirable, so as to permit the support A, which is preferably a spring-rim, to be contracted preparatory to placing the casing thereon and to permit it to expand after the casing has been placed upon it, as hereinbefore mentioned. In this way the part of the holder which engages the tube has a jointed connection with the support A at opposite sides of the gap in the latter.

In Figs. 5 and 7 the support A is provided with a spreader E for the purpose hereinbefore described, which said spreader can be duplicated, if desired. In this instance the endless inner tube is drawn taut against the base side of the casing, as before, and cement is introduced, and the tire completed substantially as hereinbefore set forth, the only difference being that the tube which has been stretched to draw it out of the casing springs back into the latter when released from the holder G. In both instances, however, the inner tube is drawn out from the casing and held under tension so as to maintain it against the base side of the casing during the process of passing liquid cement through the latter, and by such arrangement the cement while flowing through the casing will be kept away from the base side thereof.

From the foregoing it will be seen that, broadly considered, I provide for use in the cementation of inner tubes to the inner walls of tubular pneumatic-tire casings a tube-holder adapted for engaging and holding portion or portions of an inner tube drawn out from a tire-casing within which the inner tube is confined and arranged for maintaining the portion of the tube which is within the casing in a taut condition against the inner wall of the casing at the base side thereof, it being understood that the holder may be divided so as to conveniently engage portions of the tube when the latter has closed ends which are drawn out from the casing, or that it may be otherwise formed so as to engage a portion of the tube where the latter has its ends telescoped.

In the completed tire the tube will be held against all disposition to creep, and in case of large punctures or ruptures the casing can be split and opened at any desired point along its base without injuring its tubular lining.

I desire in this application to broadly claim all matters common to the two constructions of tube-holder shown, and to specifically claim the construction illustrated by Figs. 4, 5, and 6, while in another application I have elected to specifically claim the construction of tube-holder illustrated by Figs. 3 and 4.

What I claim as my invention is—

1. A device for use in the cementation of inner tubes to the inner walls of pneumatic-tire casings, comprising a tube-holder adapted for engaging and holding a portion or portions of an inner tube drawn out from a tubular-tire casing within which the inner tube is confined, and arranged for maintaining the portion of the tube which is within the tire-casing in a taut condition against the inner wall of the tire-casing at the base side thereof, substantially as described.

2. A device for use in the cementation of inner tubes to the inner walls of pneumatic-tire casings, comprising a tube-holder adapted for engaging and holding a portion or portions of an inner tube drawn out from a tubular-tire casing within which the inner tube is confined and arranged for maintaining the portion of the tube which is within the tire-casing in a taut condition against the inner wall of the tire-casing at the base side thereof, and a spreader for expanding a split in the tire-casing so as to permit liquid cement to be readily introduced within the latter, substantially as described.

3. A device for use in the cementation of inner tubes to the inner walls of pneumatic-tire casings, comprising a support for the tire-casing provided with means for engaging and holding an inner tube partially drawn out from the tire-casing so as to maintain such inner tube taut against the inner wall of the tire-casing at the base side of the same, substantially as described.

4. A device for use in the cementation of inner tubes to the inner walls of pneumatic-tire casings comprising an annular support adapted for holding a tire-casing and having a gap or opening through which a slit or opening in the base of the tire-casing can be exposed, and a holder arranged upon said support and adapted for engaging and holding taut an inner tube partially drawn out from the tire-casing, so as to maintain such inner tube taut against the inner wall of the tire-casing at the base side of the latter, substantially as described.

5. A device for use in the cementation of inner tubes to the inner walls of pneumatic-tire casings comprising an annular support adapted for holding the tire-casing and having a gap or opening through which a slit or opening in the base of the tire-casing can be exposed, and one or more spreaders for expanding such slit or opening in the tire-casing, substantially as described.

6. A device for use in the cementation of inner tubes to the inner walls of pneumatic-tire casings comprising an annular support adapted for holding the tire-casing; a tube-holder upon said support for engaging an inner tube partially drawn out from the casing; and one or more spreaders for opening a slit in the base of the tire-casing, substantially as described.

7. A device for use in the cementation of inner tubes to the inner walls of pneumatic-tire casings comprising a support for the tire-casing consisting of a spring-rim A having a gap, and a holder adapted for engaging an inner tube partially drawn out from the tire-casing and having jointed connections with said holder at opposite sides of the gap in the latter, substantially as described.

JAMES F. LAWRENCE.

Witnesses:
A. F. DURAND,
R. M. WAGNER.